Dec. 11, 1956  J. E. HOLAPPA  2,773,609
AUTOMOBILE PARKING MACHINE
Filed Oct. 24, 1952  10 Sheets-Sheet 1

FIG. 1

INVENTOR.
JOHN E. HOLAPPA
BY
ATTORNEYS

Dec. 11, 1956     J. E. HOLAPPA     2,773,609
AUTOMOBILE PARKING MACHINE
Filed Oct. 24, 1952     10 Sheets-Sheet 5

FIG. 5

INVENTOR.
JOHN E. HOLAPPA
BY
Farley Forster & Farley
ATTORNEYS

Dec. 11, 1956   J. E. HOLAPPA   2,773,609
AUTOMOBILE PARKING MACHINE
Filed Oct. 24, 1952   10 Sheets-Sheet 8

INVENTOR.
JOHN E. HOLAPPA
BY
Farley Forster & Farley
ATTORNEYS.

Dec. 11, 1956 J. E. HOLAPPA 2,773,609
AUTOMOBILE PARKING MACHINE
Filed Oct. 24, 1952 10 Sheets-Sheet 9

INVENTOR.
JOHN E. HOLAPPA
BY
*Harley Forster Harley*
ATTORNEYS

United States Patent Office 2,773,609
Patented Dec. 11, 1956

2,773,609

AUTOMOBILE PARKING MACHINE

John E. Holappa, Detroit, Mich., assignor to H. E. Beyster & Associates, Inc., Detroit, Mich., a corporation of Michigan Application October 24, 1952, Serial No. 316,716

7 Claims. (Cl. 214—16.1)

This invention relates to an automobile parking machine wherein opposed, vertical, endless conveyors carry pivotally suspended individual automobile cradles, moving them to ground level for loading and unloading and to elevated positions for storage.

In providing a parking machine of this type, wherein endless conveyor chains with automobile cradles suspended therebetween pass around upper and lower sprockets, one principal problem is encountered in the linear spacing of cradles required to provide necessary clearance between adjacent loaded cradles in passing around the sprocket turns. As an illustration of the magnitude of this problem, if it were assumed that rectangular boxes having end dimensions 8 feet wide by 6½ feet high were pivotally suspended directly between chain conveyors passing over sprockets having 8-foot diameters, the linear spacing necessary for two adjacent boxes to clear each other in passing around a sprocket would be equal to one half of the circumference of the sprocket (12.6 ft.) plus the 6½-foot height of the box or just about triple the spacing required between adjacent suspension points in vertical portions of the conveyor's travel.

While some slight reduction in linear spacing could be obtained by increasing the sprocket diameter and thereby decreasing the necessary angular separation of pivot points in passing around the sprocket, the maximum advantage obtainable in the example assumed would occur at a sprocket diameter of approximately 8%₁₀ feet at which the linear spacing of pivot points would reach a minimum of approximately 17½ feet compared to 19 feet with an 8-foot sprocket. Any further increase in sprocket diameter would increase minimum spacing as a result of the predominate effect of increasing sprocket circumference over the opposite advantageous effect of smaller angular separation of suspension points necessary to provide clearance in passing around the sprocket.

In an actual parking machine of the type under consideration, a cradle width of approximately 8 feet is required in order to extend completely under the widest passenger cars of standard manufacture, although the width of the widest automobiles at the top is substantially less than 8 feet so that a clearance advantage may be realized over the assumed example of a rectangular box which would permit the linear spacing between adjacent cradle suspension points in direct suspension between chains to be reduced to approximately double the spacing required for vertical travel. Nevertheless, such double spacing in effect wastes one half of the potential parking capacity of the machine and renders a direct suspension construction impracticable from a space-capacity standpoint.

A principal object of the present invention is to provide a vertical endless conveyor parking machine employing a cradle suspension which permits minimum clearance spacing to be maintained in the vertical portions of conveyor travel. Another object is to provide for a gradually increasing linear spacing between suspension points of adjacent cradles in entering a sprocket turn at the top or bottom of the machine such as to establish adequate clearance in negotiating the turns.

These principal objects are preferably accomplished by employing a sprocket diameter substantially less than the lateral spacing required between the two vertical lines of cradle suspension point travel together with outwardly extending linkage from the conveyor chain to the cradle suspension points which is adapted to impart a gradual acceleration to the cradle suspension points as they respectively enter a turn to increase the linear spacing therebetween and such as to impart a gradual deceleration to the cradle suspension points in leaving a turn so as to restore the normal minimum vertical spacing between adjacent suspension points.

It would be possible theoretically to obtain increased spacing of cradle suspension points at the sprocket turns by providing, in effect, outwardly extending cradle suspension arms having a fixed relationship with given chain links at appropriate intervals to provide minimum clearance spacing in vertical travel and an increased spacing throughout sprocket travel proportional to the increased effective radius of the extension arm over the sprocket radius. For example, a 5-foot diameter sprocket together with 2½-foot suspension arms extending outwardly from the chain to the cradle suspension points at 6½-foot intervals would produce a 6½-foot spacing between cradle suspension points in vertical travel and a 13-foot linear spacing between adjacent cradle suspension points in passing around the sprocket. However, apart from the difficulties of absorbing the high torque imparted to the individual chain links incident to the loads operating on 2½-foot lever arms, such a construction would involve substantially instantaneous acceleration of each load from chain speed to double chain speed at the moment that the associated chain link engaged the sprocket in entering a turn. This would involve shock loading of the linkage to such an extent as to require excessively low speed of operation as well as excessively heavy construction of the chain and linkage mechanism to absorb the high stress and wear. Thus, in order to render increased spacing at the sprocket turns practicable, provision must be made for gradual acceleration and deceleration of cradle suspension points as distinguished from any sudden change in speed.

In accordance with the present invention, such gradual acceleration as well as commercially feasible stress loads in the suspension members are accomplished by employing outwardly extending cradle suspension arms pivotally connected at their inner ends to the conveyor chain at intervals equal to minimum vertical clearance spacing together with upper and lower support arms pivotally connected to the conveyor chain and each other halfway between adjacent suspension arms and pivotally connected to each other outside of the cradle suspension points, sliding supporting connections being provided between the outer ends of the support arms and extensions of the cradle suspension arms which accommodate necessary movement of the support points along the cradle suspension arms in negotiating sprocket turns.

Another problem encountered in providing a commercially feasible machine of this type, which will accommodate substantially all of the standard makes of passenger cars with an adequate numerical capacity to justify the ground area utilized, arises from the considerable loads to which the conveyor chains are subjected. Thus, for example, if a machine extending to a ten-car height were to employ a pair of endless conveyor chains of commercially available design each of which had the capacity to carry one half of the combined weight of ten passenger cars and cradles (in the order of 25,000 pounds per chain) the pitch of the chain would be such as to provide an undesirably uneven or rough sprocket engagement. Accordingly, another object of this invention is to provide a sprocket and chain construction which will utilize commercially available chain while avoiding the mentioned uneven chain engagement. This object is met by employing a multiple chain and sprocket construction at each end of the machine which permits the use of commercially available chain of sufficiently small pitch to provide necessary uniform smoothness of sprocket engagement.

Another object of this invention is to provide a machine which may be utilized in multiple unit garage installations relative to either or both longitudinal and lateral directions and which will thereby be adaptable to available ground areas of a wide variety of sizes. In order to facilitate such multiple unit installations and provide desired driving access to the various individual parking machines, a construction is employed wherein an open cradle space is provided at at least one point in each machine which, when registered at the lowermost position of conveyor travel, provides driving clearance under the entire machine thereby making it possible to maintain a substantially open ground floor, apart from stationary structural columns, for ready driving access to or from any given machine. Thus, any of the cradles of the various machines may be moved to floor level for loading or unloading as desired and the machines then restored to a storage condition with the open spaces at the bottom.

Another object is to incorporate in a machine of this type provision for accumulating melted snow, or other drippings from each individual car in order to prevent the same from falling on cars below. This object is accomplished by providing a continuous cradle platform extending to the extremities of the largest car accommodated having fixed side retaining walls and one or more movable end ramps which are automatically lowered when the cradle is moved to ground level and automatically raised to a retaining position when the cradle is moved to a storage position. In order to accommodate the discharge of any accumulated water, an automatic valve is also incorporated which opens when the cradle is moved to ground level and remains closed at all other times.

Another object is to incorporate reaction means for engagement by roller elements of the chains in vertical travel to absorb any lateral load arising from the outward suspension of the cradles.

Another object is to provide means to substantially confine the chain in vertical travel in a manner whereby the contingency of chain breakage is rendered less hazardous. To meet these latter objects, relatively confining chain guide tracks are incorporated which extend to points immediately adjacent sprocket perimeters whereby the links under any brake in the chain will be retained in a substantially vertical position under compression rather than permitted to fall freely.

Another object is to provide a cradle construction accommodating substantial overlapping of adjacent cradles as required to effect minimum spacing in vertical travel.

These and other objects will appear more clearly from the following detailed description of a preferred embodiment together with alternate suspension linkage constructions and by reference to the drawings forming a part of this disclosure wherein.

Figure 1:
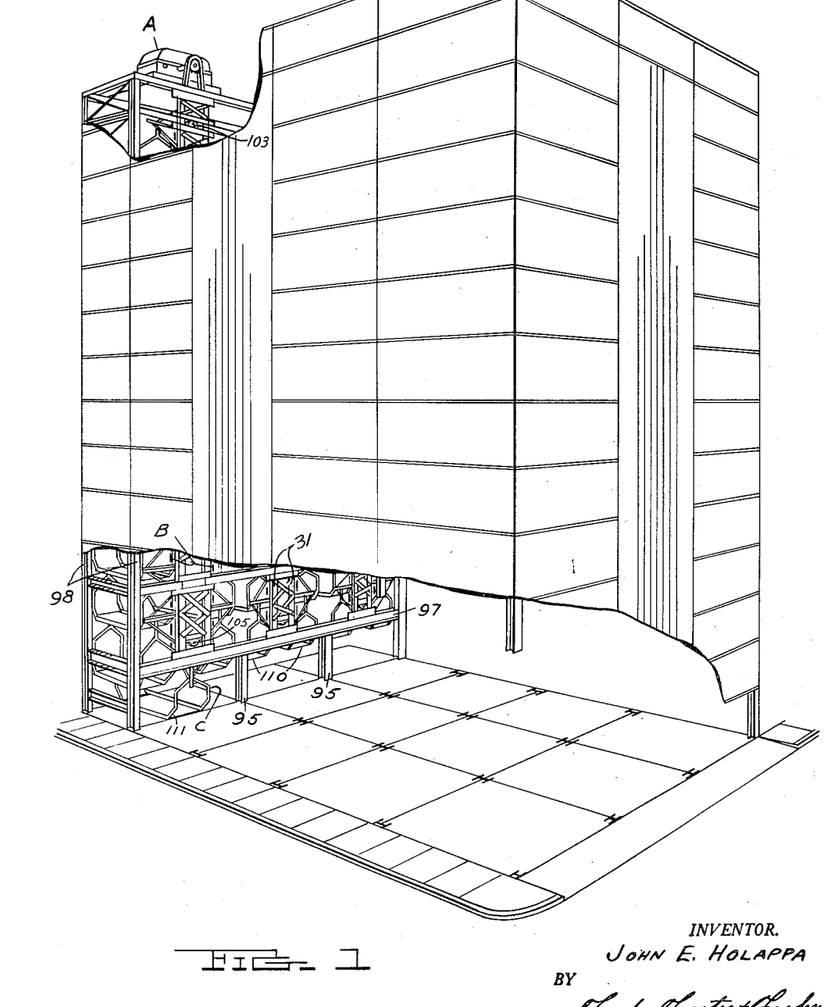
Fig. 1 is a somewhat schematic perspective view of a typical garage installation partially broken away to show three laterally spaced parking machines employing common structural framework as well as the general space layout for additional longitudinally spaced machines and showing the general proportions of a building which would incorporate fifteen 20-unit machines having a total capacity of 300 passenger cars.

Referring to Fig. 1 it will be seen that a typical garage installation may include both laterally and longitudinally spaced parking machines occupying any given rectangular ground area having multiple dimensions of a single machine. Common structural framework includes main supporting columns 95 which form the only structural barriers to an open driving area at ground floor level. Main transverse girders 97 support conveyor suspension columns 31 which with the main corner columns 98 extend to the top of the machine. Individual independent motor and reduction gear units generally indicated as A are provided above and adapted to drive endless conveyor chains B passing over upper and lower sprockets having bearings 103 and 105. Suspended from linkage connected to the conveyor chains are a plurality of individual automobile cradles C, any of which may be lowered to ground level position as shown at 111 for loading and unloading and then raised to a storage position by movement of the endless conveyor chains, the cars remaining in the individual cradles during storage. Each machine includes an open space which may be brought into alignment with the bottom of the conveyor travel for complete driving clearance under adjacent cradles such as 110.

Figure 2:
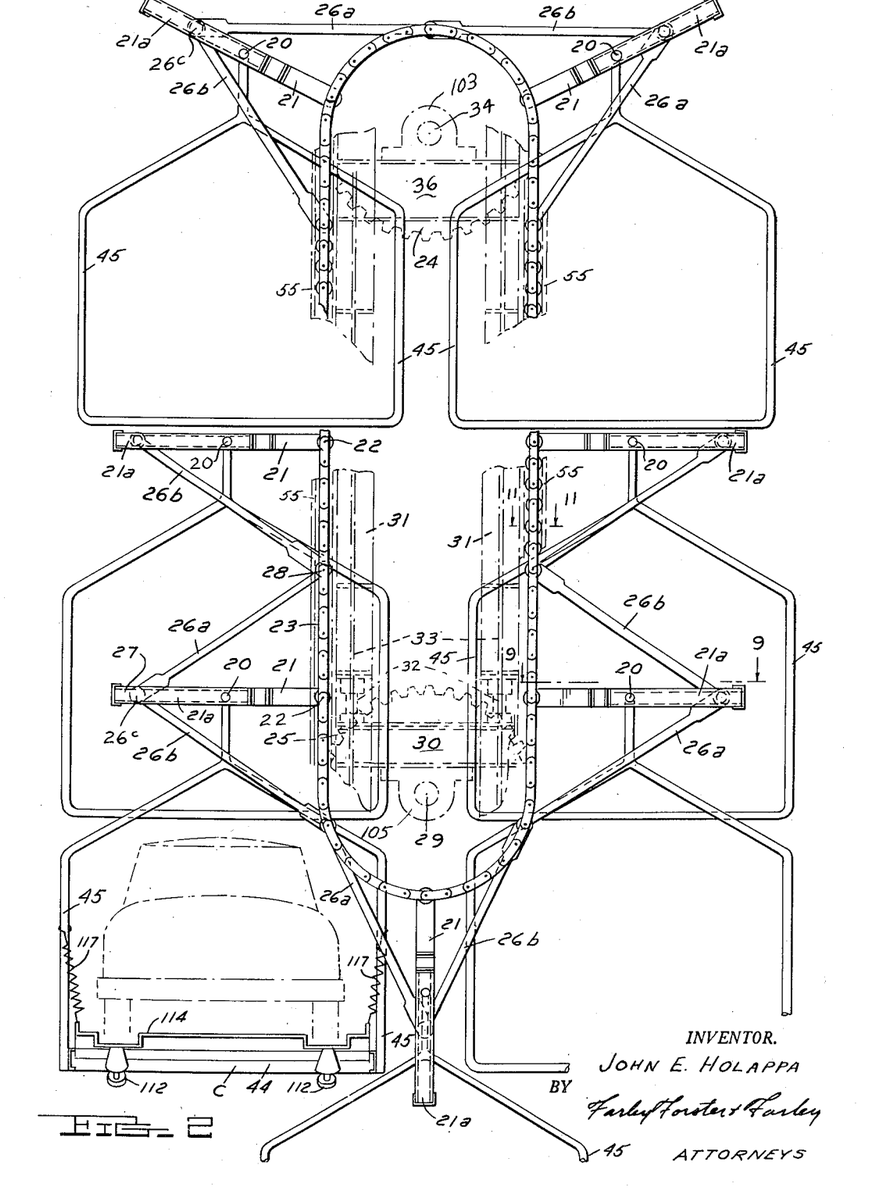
Fig. 2 is an end elevation of the conveyor mechanism per se broken away to omit the central portion and showing in general outline typical cradle suspensions at the upper and lower ends of the machine.
Figure 3:
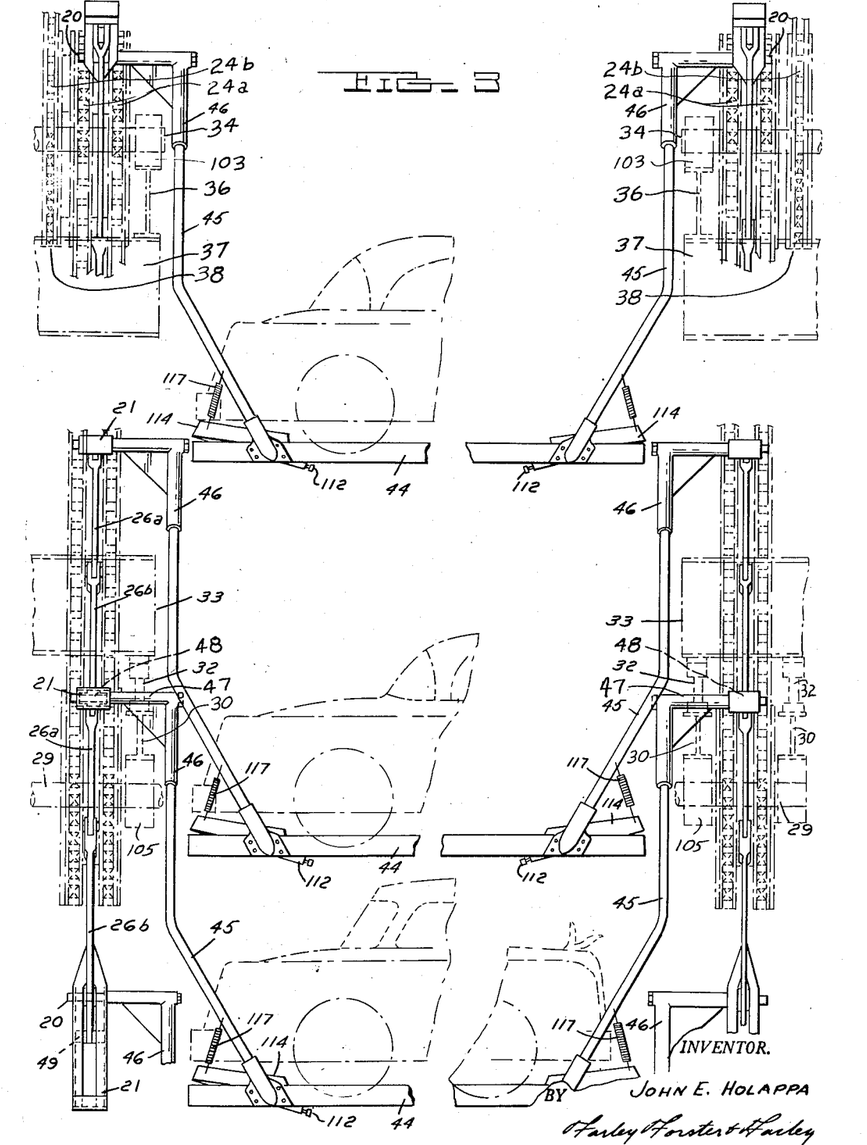
Fig. 3 is a view similar to Fig. 2 showing a side elevation of the conveyor and cradle suspensions.

Referring to Figs. 2 and 3 disclosing the conveyor cradle suspension for a single machine it will be seen that the individual automobile cradles C are pivotally suspended from points 20 on longitudinally spaced cradle suspension arms 21 the inner ends of which are in turn pivotally connected at 22 to double conveyor chains 23 which pass over upper drive sprockets 24 and lower free sprockets 25, respectively, at the top and bottom of the machine.

Each cradle suspension arm 21 has an extension 27 beyond the cradle suspension point 20 which is supported by upper and lower support arms 26a and 26b. Such support arms are pivotally connected to each other at 26c and slidably connected to the outer end 27 of the cradle suspension arm preferably by a roller engagement which will presently be described in greater detail. The adjacent support arms 26a, 26b associated with adjacent suspension arms 21 are pivotally connected at their inner ends to a pivotal connection 28 of the conveyor chain, such connection point being midway between the pivotal chain connections 22 of the respective suspension arms. The longitudinally spaced lower free sprockets 25 are rotatably connected to each other by a common through shaft 29 journaled in bearings 105 mounted on transverse members 30 suspended from chain take-up jacks 32 in turn suspended from fixed bearing support members 33 extending out from conveyor suspension columns 31.

Figure 12:
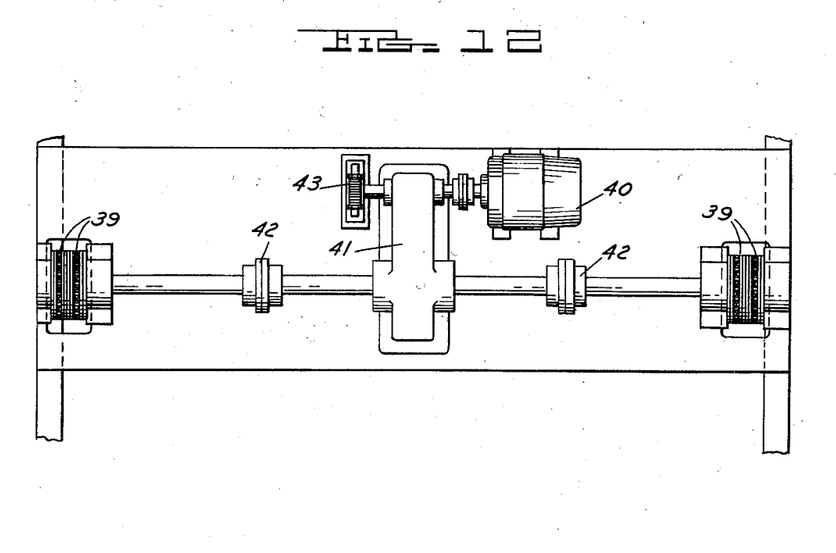
Fig. 12 is a plan view of a motor drive, reduction gearing and sprocket chain drive for a single machine taken along the line 12—12 of Fig. 5.

The upper longitudinally spaced drive sprocket assemblies 24 incorporate pairs of integrally connected main conveyor output drive sprockets 24a, input drive sprockets 24b having common axle shafts 34 journaled in laterally spaced bearings 103 supported on beams 36 and lower structural members 37 extending out from conveyor suspension columns 31. Input drive chains 38 for engaging the input drive sprockets 24b are driven by pinion sprockets 39 shown in Fig. 12, the latter sprockets being driven from a reversible motor 40, speed reducer 41 and drive couplings 42. An electrically de-energized brake 43 is provided in the absence of self-locking characteristics in the speed reducer.

As best shown in Fig. 3, the cradles are constructed to nest within each other in substantially overlapping relation during vertical conveyor travel. The cradles have drive on platforms 44 supported at either end by a pair of upwardly diverging cradle arms 45 each of which converges above car level to a common extension arm 46 having an outward projection 47 to provide clearance between the cradle members and the upper sprocket bearing supports. Each of the extensions 47 is journaled in a bearing 48 seated near the center of the cradle suspension arm 21.

Figure 9:
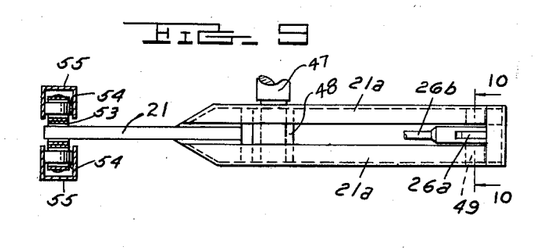
Fig. 9 is an enlarged fragmentary plan view of the pivotal connection of a pair of cradle support arms and their outermost supporting relationship with a cradle suspension arm taken along the line 9—9 of Fig. 2.
Figure 10:
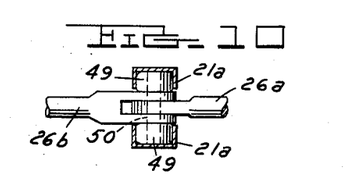
Fig. 10 is a sectional end view of such pivotal and supporting connection taken along the line 10—10 of Fig. 9.

As best shown in Figs. 9 and 10, the outer end of the cradle suspension arm 21 is preferably constructed with a pair of channel members 21a forming guide tracks for antifriction rollers 49 having a pin connection 50 with the pivotal joint of the support arms 26a, 26b.

Figure 11:
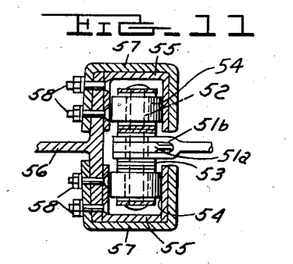
Fig. 11 is a fragmentary sectional plan view of a double conveyor chain and guide track taken along the line 11—11 of Fig. 2.

As shown in Fig. 11, the inner ends 51a, 51b of the support arms 26a, 26b are provided with a common pivotal pin connection 52 to the inner and outer side bar links 53 of the double conveyor chain generally indicated as 23 in Fig. 2. The rollers 54 of such double chain engage a channel guide track 55 which extends the entire vertical height of the machine, such guide track being secured at intervals to the conveyor suspension columns 31 by connecting members 56, 57 and bolts 58.

With the above described cradle suspension it will be seen that throughout the vertical travel of the machine the cradle suspension arms 21 will remain in a horizontal position traveling at conveyor chain speed with substantially minimum clearance between each cradle platform and the roof of a car on the adjacent lower cradle and that the weight of each loaded cradle applied at each pivotal suspension point 20 will be distributed approximately equally between the two supporting points for the suspension bar 21, approximately one half of such load being balanced by a direct vertical chain tensile force at the pivot point 22, while the remainder of such load is balanced by equal tensile and compressive forces in the respective supporting arms 26a and 26b. Since the inner ends of the supporting bars 26a, 26b of adjacent cradles are connected to a common pivotal point 28, the horizontal components of force in such members will counterbalance each other in the case of equally loaded cradles so that the lateral reaction load of the conveyor chain rollers 54 against the channel guide track 55 will be minimized and largely eliminated in the case of a fully loaded machine. This will be understood to provide a marked advantage in minimizing operation friction arising from roller engagement of the guide track as compared, for example, with a case where supporting arms 26a and 26b were not connected to a common pivotal point whereupon the entire horizontal component of the load in such members would result in a lateral pressure engagement of the conveyor chain rollers with the guide track involving relatively high frictional losses, wear and power requirements.

Figure 13:
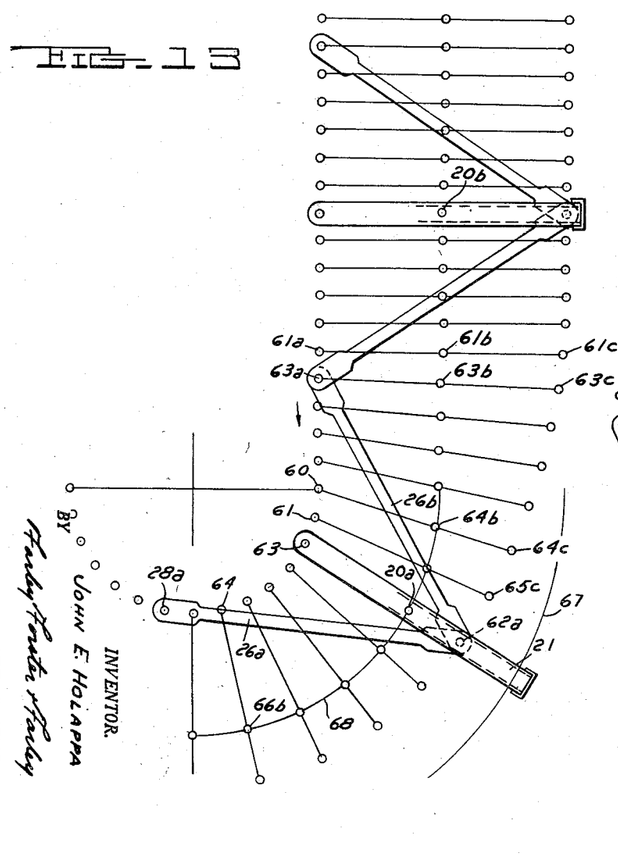
Fig. 13 is an enlarged end elevation layout of the cradle suspension linkage for two adjacent cradles, the lowermost of which has started its travel around the lower sprocket in a counterclockwise direction and including a schematic layout of associated chain, cradle suspension, and supporting arm pivotal connecting points for uniform increments of conveyor chain travel.
Figure 14:
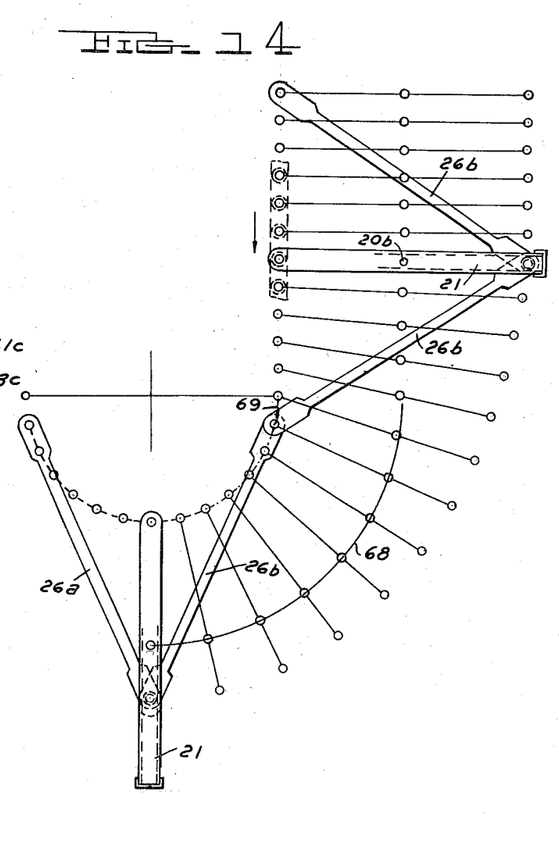
Fig. 14 is a view similar to Fig. 13 showing the relationship of adjacent suspensions when the lowermost cradle suspension arm has progressed to a loading position.

Referring now to the operation of this linkage suspension in passing around a sprocket turn at the top or bottom of the machine which constitutes the most important feature of this invention, an examination of Figs. 13 and 14 will disclose the nature of such action. In these figures which illustrate in full line two progressive positions of two adjacent linkage suspensions in entering a turn around a lower sprocket, intermediate progressive positions of the pivotal points of the support and cradle suspension arms are plotted at equal increments of conveyor chain travel chosen for convenience at unit chain length intervals. The suspension bar is represented at such intermediate positions by a single line joining the pivotal connecting points determinative of cradle position.

Prior to the time that the pivotal connection 28a of the leading supporting arm 26a reaches the initial sprocket engagement point 60, the leading cradle suspension arm 21 will be seen to assume a horizontal position the same as the following cradle suspension arm with the cradle suspension points 20a and 20b separated by a distance equal to the minimum clearance spacing of adjacent loaded cradles for vertical travel, each of such cradle suspension points then traveling at equal speed corresponding to conveyor chain speed. As the leading supporting arm chain connecting point 28a moves from point 60 to point 61 on the sprocket, a slight horizontal component of movement gradually increasing from zero value is transmitted to such arm which has the effect of imparting a slight inward movement to the pivotal connection 62a of the leading supporting arms 26a, 26b. This in turn imparts a slight forward articulation to the leading suspension arm 21, due to the relatively fixed relationship of the associated chain connecting points of the leading suspension arm 21 and supporting arm 26b, and a corresponding acceleration to the leading suspension point 20a relative to chain speed. The position of the leading cradle suspension arm 21 after such initial articulation is represented by the line joining the pivotal connection points 61a, 61b and 61c.

As the connection point 28a continues to advance from point 61 to point 63 on the sprocket an increasing horizontal component of such movement imparts an increasing inward movement to the pivotal connection point 62a and a further corresponding articulation to the leading suspension arm 21 and linear advance of the suspension point 20a away from the following cradle suspension point 20b bringing the leading cradle suspension arm 21 to the position represented by pivot points 63a, 63b, 63c. Such progressive articulation of the leading suspension arm 21 will continue while the conveyor chain connecting points of the leading suspension arm 21 and its support arm 26b continue on a straight path approaching the sprocket until, when the chain connecting point of the support arm 26a reaches a point 64, the leading cradle suspension point will reach a position 64b and the chain connecting point of such suspension arm will itself enter the sprocket turn. It will be noted that while up until this point the articulation of the suspension arm 21 has been in a forward direction and the cradle suspension point is continuously accelerated to a position substantially advanced from a line normal to the conveyor chain, a change in the action of the linkage now takes place. Thus, while the pivotal connection of the leading supporting arms 26a, 26b now continues to move inward as indicated by points 64c, 65c, the effect produced on the cradle suspension arm 21 is now a backward articulation relative to a line normal to the conveyor chain. Such change in action is due to the fact that while the cradle suspension point continues to accelerate relative to chain speed it has not yet reached the speed of a comparable point on a radial line passing through the center of the sprocket and the chain connecting point of the suspension arm. Accordingly, while prior to the time that the chain connecting point of the suspension arm reached the sprocket the suspension arm had articulated in a forward direction, such suspension arm begins to articulate in a backward direction as soon as the chain connecting point of the suspension arm enters engagement with the sprocket and continues decreasingly such backward articulation until it reaches a position normal to the chain, that is on a radial line passing through the center of the sprocket and the chain connecting point of the suspension arm, which will take place when the chain connecting point of the associated support arm 26b reaches the point of sprocket engagement. At this moment the cradle suspension point will have reached a position 66b coinciding with the mentioned comparable point on a radial line and attained a maximum speed equal to that of such radial point which is substantially double conveyor chain speed. Such maximum speed will be uniformly maintained until the chain connecting point of the leading support arm 26a passes off the sprocket whereupon a gradual deceleration in the linear speed of the cradle suspension point exactly the reverse of that described in entering the sprocket turn will occur.

It will be noted that, while the supporting arm pivotal connection 62a moves progressively inwardly as the result of the linkage action in entering a sprocket turn to an ultimate position much closer to the conveyor chain than prevails throughout the vertical travel of the conveyor, as indicated for illustration by the departure of such point from the circular arc 67 drawn from the center of the sprocket at a length equal to the normal spacing of the supporting arms' pivotal connection from the center line of the conveyor, nevertheless, the path of the cradle suspension point 20a conforms very closely to a true circular arc 68 having a radius equal to the normal spacing of such suspension point from the conveyor center line. It will also be noted from the plotting of the progressive cradle suspension points that the speed of the cradle is indicated by the proportional spacing between successively plotted points as compared with a constant conveyor chain speed indicated by the equal spacing of plotted chain connecting points. It is also apparent that the increment in spacing between successively plotted cradle suspension points represents the acceleration progressively imparted to the cradle suspension points. From these considerations it is apparent that the substantially equal increments in spacing of successive cradle suspension points from the time that accelerating action is initiated to the time that all linkage elements for a given cradle have their chain connecting points traveling on the sprocket demonstrate that a substantially uniform gradual acceleration is imparted to the cradle throughout such span of travel.

Fig. 14 shows the relationship of adjacent linkage elements when the leading cradle has reached its lowermost position. While at this point the accelerating action of the following cradle has just begun and while the leading cradle will begin to decelerate as soon as the chain connecting point of the leading support arm 26a passes off of the sprocket, a continuing increase in the relative linear spacing of the adjacent cradles will take place until the acceleration of the following cradle brings it to a speed equal to that of the decelerating leading cradle, which point of maximum linear spacing will occur when the common supporting arm chain connecting point 69 reaches a center-line position at the bottom of the sprocket whereupon the adjacent cradles will be at the same horizontal level.

In adapting this cradle suspension linkage to a specific requirement for a given parking machine the following variable factors may be given consideration.

The ratio of sprocket diameter to the horizontal spacing of the vertical cradle suspension lines will determine the extent of linear separation of adjacent suspension points which will occur at a sprocket turn. By decreasing the sprocket diameter and providing longer suspension and support arms to maintain the lateral spacing of the vertical lines of cradle travel, increased acceleration and linear spacing between cradle suspension points may be obtained.

The following hypothetical example will demonstrate a feasible empirical method for designing actual dimensions of the suspension arms and sprocket to meet specific requirements. Let it be assumed that a cradle platform width of 8 feet is to be employed to accommodate a widest passenger car of approximately 7 feet; that a highest car will extend 6 feet above the bottom of a cradle platform; that a 6-inch vertical clearance is desired in vertical travel; and that a 1-foot horizontal clearance spacing between cradles in vertical travel is desired. The approximate path of cradle suspension points in passing around a sprocket may be laid out on a semicircular path of 4½-foot radius. By using a pair of scale models each having the cross sectional outline of a cradle and showing a rectangular car outline 7 feet wide and 6 feet above the bottom of the cradle to assure adequate corner clearance, such models may be moved with the cradle suspension points along the assumed path to a point of critical clearance with minimum linear spacing. This critical point will occur when the inner lower edge of one cradle platform is immediately adjacent the inner roof corner of the assumed car outline on an adjacent cradle. Plotting these critical cradle suspension points on such path one of the cradle suspension points will be on a curved portion of the path while the other is on a vertical portion of the path. It may next be assumed that the cradle suspension arm associated with the suspension point on the curved portion of the path will lie approximately along a radial line intersecting the center of the sprocket, and such radial line may be drawn and assumed to contain the chain connecting point of the suspension arm. A trial sprocket radius may now be drawn which will establish a trial chain path and a number of links may be plotted along such path corresponding to the 6-foot 6-inch spacing between the chain connecting points of adjacent cradle suspension arms. If an appropriate sprocket radius has been chosen, the last plotted chain link will have a connecting point approximately in horizontal relation with the plotted cradle suspension point on the vertical line of cradle travel, or if the center point between the chain connecting points of the adjacent suspension arm lies on the trial sprocket curve indicating a nonhorizontal position of the latter cradle suspension arm, the last plotted chain link connecting point should fall slightly out of horizontal alignment with the latter cradle suspension point corresponding to the articulated position of such cradle suspension arm arising from the associated support arm chain connecting point on the sprocket radius. If the assumed trial sprocket radius is too large it will be immediately apparent since the last chain link connecting point will fall short of a horizontal position relative to the associated cradle suspension point, while, if too small a sprocket radius has been chosen, such last chain link connecting point will extend too far past a horizontal relationship with such associated cradle suspension point. Thus, by simple trial and error plotting of sprocket radii and chain links between suspension arm chain connecting points an appropriate sprocket radius may readily be found.

Having established an appropriate sprocket radius, the required length of support arms may be found by laying out the linkage members in their lowermost position as shown in Fig. 14 at which position the common support arm connecting point lies closest the cradle suspension point. Having established the sprocket radius, length of support arms and cradle suspension path, the necessary length of the cradle suspension arm extension may be determined by laying out a pair of support arms at a vertical portion of the conveyor chain and this in turn will determine the necessary height of the cradle suspension point above the bottom of the cradle platform to provide drive on clearance between the roof of a car and the cradle suspension arm extension when the cradle is in a car loading position. Thus, all factors are established to lay out an exact progressive series of linkage connecting points, as in Fig. 14, whereupon the required clearance between adjacent cradles passing around a sprocket turn may be verified.

In the example in question it will be found that the critical clearance point occurs when one of the cradle suspension points is approximately three quarters of the way around the sprocket and the other cradle suspension point is approximately 2 feet above the center line of the sprocket. A sprocket diameter of approximately 3½ feet will be found to provide the necessary spacing at this critical point and assuming twelve chain links of 6½ inches each to provide the normal 6½-foot spacing between adjacent cradles, the support arm chain connecting points would extend approximately one chain link beyond the sprocket engagement point on either side when the associated cradle is at its lowermost position. With this linkage a maximum linear speed of cradle travel of approximately 2⅔ chain speed would be reached which would involve a somewhat higher rate of acceleration and greater loading of cradle support arms than in the case of linkage proportioned in the case of Figs. 13 and 14 corresponding to a sprocket diameter of approximately 5 feet and a spacing of vertical cradle suspension lines of approximately 10 feet providing a maximum linear cradle speed of approximately twice conveyor chain speed.

Another approach to providing actual linkage dimensions for minimum clearance spacing would be to start with a given sprocket diameter such as one wherein the total length of chain engagement around one half of the sprocket would just equal the twelve link spacing between adjacent support arm chain connecting points. By assuming an approximate length of support arms appropriate thereto, successive points of the outer support arm connecting as well as progressive lines representing the cradle support arm may be plotted. Proceeding therefrom to determine the minimum horizontal spacing of the vertical cradle suspension lines to provide clearance in passing around the sprocket, trial circular arcuate cradle suspension point paths may be laid out and checked against the models in the area of critical clearance until a path providing just sufficient linear spacing for adequate clearance is established. In this manner, assuming car and cradle proportions as before, it can be determined that the use of a twenty-four-tooth sprocket with twelve 6½-inch chain links between adjacent cradles will permit a 9½-foot horizontal spacing of cradle suspension lines and provide a maximum linear speed of conveyor travel equal to approximately 2⅓ times conveyor chain speed, together with maximum acceleration and support arm loads intermediate those of the first hypothetical example above and those obtained with the linkage portions shown in Figs. 13 and 14.

Thus, it will be seen that the preferred linkage under consideration adapts itself to certain dimensional flexibility to meet particular desired clearances, and the proportion of the sprocket spanned by the support arms may be somewhat less than, equal to, or greater than the total engagement arc of the conveyor chain.

While it would be possible to provide an operative construction employing the general type of linkage shown in Figs. 13 and 14 which did not employ common pivotal chain connections for adjacent support arms, e. g., by having one or more chain links interposed between adjacent support arm connecting points to provide either an overlapping or otherwise spaced relationship, it will be understood that any such variation would be accompanied by unnecessary and undesirable lateral loads on the individual chain rollers against the guide tracks with resultant unnecessary frictional losses which are largely avoided by the balancing of lateral loads through the use of the preferred common connecting points as previously discussed.

Figures 15, 16:
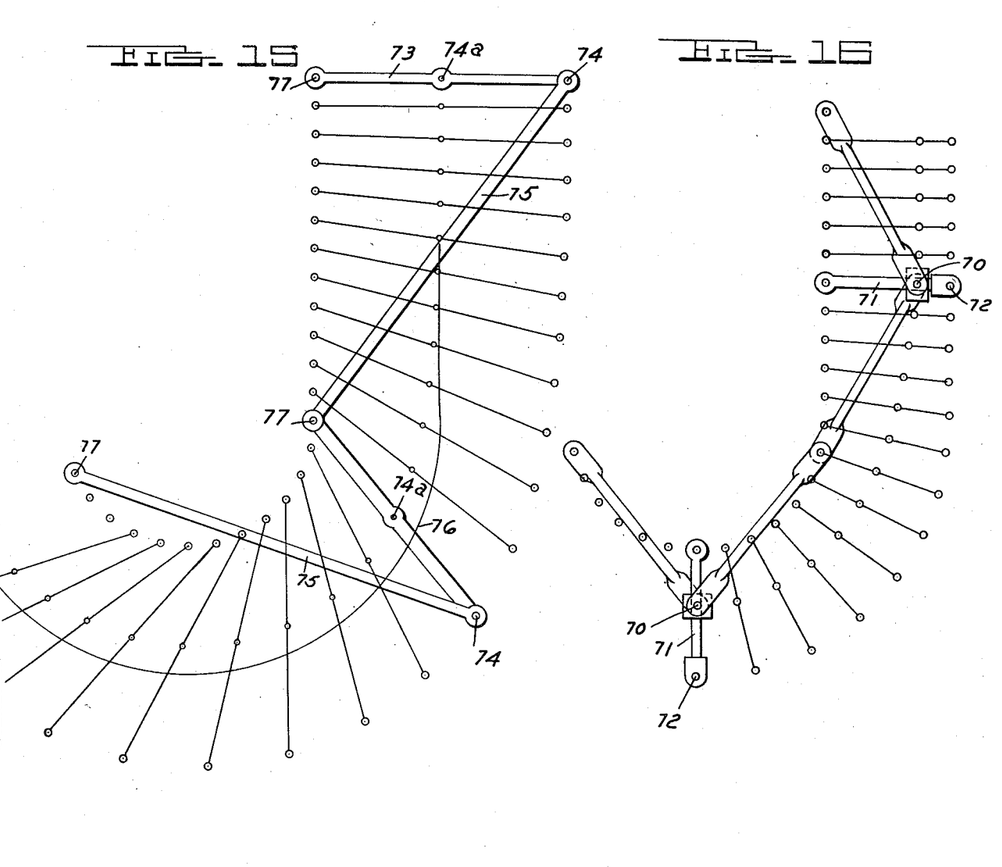
Fig. 15 is a view similar to Fig. 13 showing an alternate linkage wherein the cradle suspension arm is supported by a single supporting arm pivotally connected thereto.
Fig. 16 is a view similar to Fig. 14 showing an alternate linkage wherein supporting suspension arms are pivotally connected inside of the cradle suspension point.

The modified linkage shown in Fig. 16, wherein the support arm connecting point 70 slidably supports the cradle suspension arm 71 on the inside of the cradle suspension point 72, provides substantially the same accelerating action as in the case of the preferred linkage of Figs. 13 and 14 wherein the support is on the outside of the cradle suspension point. However, it will be noted that in the case of the linkage of Fig. 16, instead of substantially one half of the load being applied in direct tension to the conveyor chain through the suspension arm connecting point as in the case of the preferred linkage, a negative load is applied at such connecting point and the loading of the support arms is multiplied rather than divided by the difference in the lateral spacing of the cradle suspension point from the conveyor chain and that of the support arm connecting point. Such loading is substantially increased when the sprocket action causes the support arm connecting point 70 to move inwardly providing an increased leverage of the cradle load acting upon the support arms with resultant excessive loading of the support arms relative to that obtained with the preferred linkage of Figs. 13 and 14. In addition, the preferred linkage provides a somewhat more uniform rate of acceleration and deceleration throughout the portion of sprocket engagement which imparts changing linear speed to the cradle suspension points which is preferable from the standpoint of minimizing acceleration loads on the linkage.

In Fig. 15, a further alternate suspension linkage is shown wherein the cradle support arm 73 is directly pivotally connected at 74 to a single support arm 75 which spans the entire distance between adjacent cradle suspension arms. From the progressive plotting of support arm connecting points shown in such figure, it is apparent that this linkage provides a gradual linear acceleration of the cradle suspension point $74a$ as the result of the support arm chain connecting point passage around the sprocket up to a maximum speed of approximately twice conveyor speed. However, it will also be noted that as a result of the substantial inclination imparted to the cradle suspension arm 73 relative to a radial line, the path of the cradle suspension point $74d$ is caused to move inwardly to an effective radius substantially less than that established by the preferred linkage of Figs. 13 and 14 or by the alternate linkage of Fig. 16, as may be seen by the considerable departure of the path of the cradle suspension point in Fig. 15 from a path 76 having a radius which would prevail if the support arm maintained a position normal to the chain path. The result of such inward movement of cradle suspension point is to reduce the effective increase in linear separation between adjacent cradle suspension points with resultant loss of efficiency in producing required clearance as compared with the preferred linkage which maintains the suspension arm in a near normal relationship with the conveyer chain path. In addition, the linkage of Fig. 15 fails to provide a counterbalancing of horizontal components of support arm loading with resultant continuous lateral loading of the conveyor chain link at the point 77 of support arm connection throughout the entire vertical travel of the conveyor producing relatively higher friction loss and wear.

Figure 17:
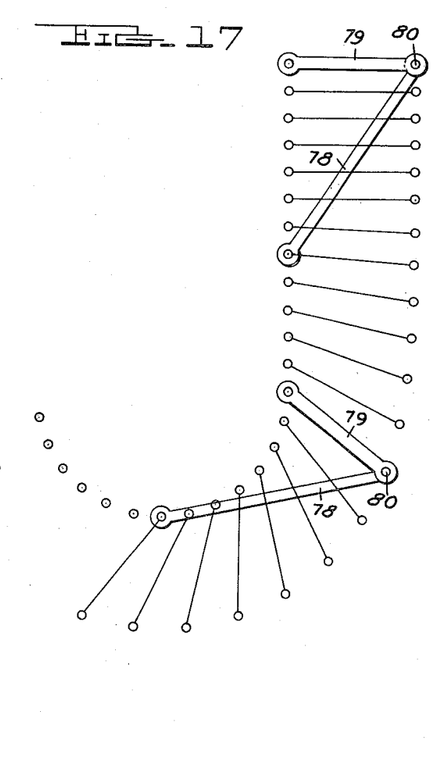
Fig. 17 is a view similar to Fig. 13 showing an alternate linkage wherein a single supporting arm is adapted to pivotally connect to the cradle suspension arm at the cradle suspension point.

Fig. 17 illustrates a further alternate linkage capable of producing a gradual acceleration of cradle suspension point in passing around the sprocket wherein a single support arm 78 is pivotally connected to the cradle suspension arm 79 at the cradle suspension point 80. While this linkage again produces a maximum linear cradle speed of approximately twice conveyor speed, it is not feasible to have the support arm 78 span the entire distance between adjacent cradle support arms so that the entire acceleration of a given cradle suspension point must take place over a relatively short segment of sprocket travel producing relatively high acceleration loads. In addition this linkage is again subject to the relative disadvantage of causing a substantial inclination of the support arm 79 with resultant substantial inward movement of the cradle suspension point during its linear acceleration as well as objectionable lateral loading of the chain rollers at the suspension arm and support arm connecting points.

Figures 18, 18A:
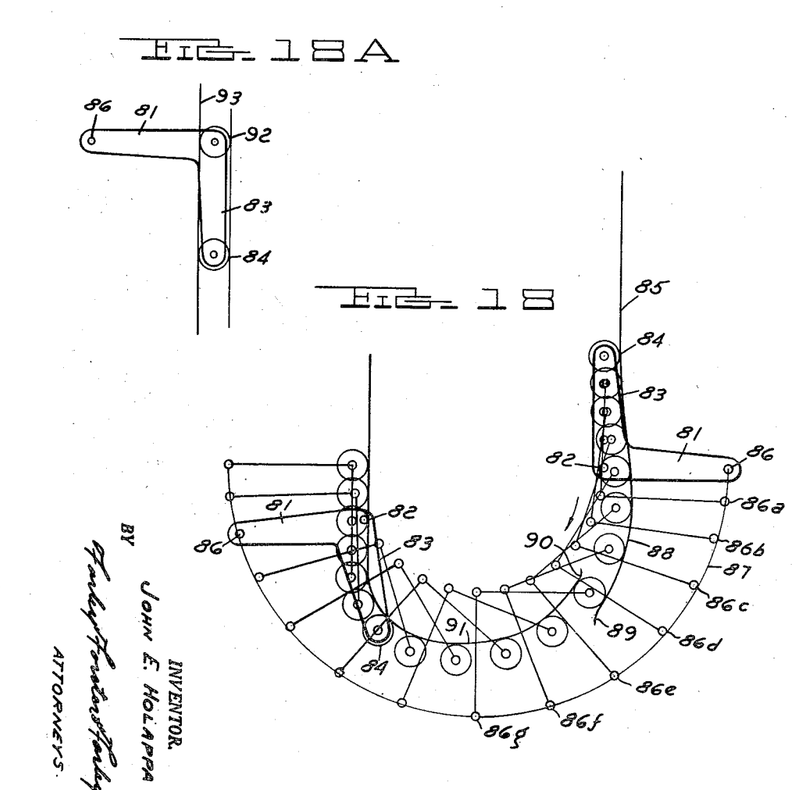
Fig. 18 is a similar view of a further alternate construction employing a bellcrank suspension with articulation controlled by cam means to produce desired gradual acceleration and deceleration of the cradle suspension point.
Fig. 18A shows such bellcrank with an antifriction roller provided at the chain connecting point.

Fig. 18 discloses still another cradle suspension capable of providing desired gradual acceleration of the cradle suspension point in providing necessary load clearance in passing around the sprocket. In this case a bellcrank and cam construction is employed to provide desired articulation of the cradle support arm 81 pivotally connected to the chain at 82. A rigid bellcrank arm extension 83 has an antifriction roller 84 which is adapted to follow a straight track 85 throughout vertical portions of conveyor travel providing necessary supporting reaction for the torque imparted to the cradle suspension arm 81 by the cradle load at 86.

At any desired point approaching the sprocket turn the track may be provided with a curvature appropriate to impart desired gradual articulation of the support arm 81 and gradual linear acceleration of the pivotal suspension point 86. In the illustration shown, cradle acceleration is confined to the arc of sprocket engagement necessitating an acceleration to a maximum speed of approximately 2⅔ times conveyor speed. However, it is apparent that by beginning the curved portion of the track 85 at an earlier point a more gradual acceleration and lower maximum cradle speed comparable to that provided by the preferred linkage of Figs. 13 and 14 may be readily provided.

In order to determine the required curvature of track to provide any desired gradual uniform cradle acceleration, progressive suspension points such as 86a to 86g having uniform increments in spacing may be plotted between any desired starting point of acceleration and the vertical center line of the sprocket along the approximately circular path of the cradle suspension points, such suspension points being chosen to correspond to an equal number of chain link connecting points between such relative positions. By next connecting the cradle suspension points with the associated chain link connecting points and constructing right angle extensions from such lines corresponding to the bellcrank extension 83 with circles at the ends of the extensions corresponding to the roller 84, a curved line 88 tangent to such circles may be drawn which will correspond to the path of the track required to provide the desired cradle acceleration.

It will be noted that after the cradle load reaches a dead center position, such as at 86g, track reaction on the opposite side of the roller is required due to a reversal of the effective moment on the cradle suspension arm 81. Thus, the track 88 for contact by the outside of the roller 84 will terminate at a point 89 slightly past that corresponding to the dead center position of the associated cradle suspension point and a track 90 for engaging the opposite side of the roller will begin at a point just before that corresponding to such dead center position thereby assuring continuous reaction engagement of the roller and track as required.

It is clear that a track contour 91 providing desired gradual uniform deceleration of the cradle suspension point may be constructed in a manner similar to that of track 88 and that the deceleration back to conveyor speed likewise may be caused to take place over any desired length of chain travel. Thus, it will be seen that this alternate construction provides complete flexibility in providing any desired acceleration of cradle to achieve necessary clearance spacing. However, it will be noted that this alternate construction is subject to the disadvantage of lateral loading of the conveyor chain roller to which the suspension arm 81 is connected, as well as the lateral loading of roller 84, which is to a large extent overcome by the counterbalancing of lateral loads achieved in the preferred linkage of Figs. 13 and 14. In order to meet this problem it might be desirable as shown in Fig. 18A to provide a second antifriction roller 92 at the chain connecting point together with an additional track member 93 for engagement by such roller throughout vertical travel, which latter track might be employed in lieu of the conveyor chain track for engagement by the chain rollers.

Referring again to Figs. 4 and 5 it will be recalled that common structural framework is provided for multiple machine installations wherein at ground level only the main common column supports 95 form permanent barriers to wide open driving floor space, the main girders 97 for carrying the conveyor suspension columns 31 being supported by all floor columns while only the corner columns 98 extend to the full height of the machines. It is clear from these figures that in addition to the main structural members already described supplemental transverse beams 96 may be provided at suitable intervals with reinforcing cross members 99 and in like manner, longitudinally extending horizontal beams 100 extending between adjacent machines and connected to intermediate vertical members 101 may be reinforced by cross members 102.

Figure 4:
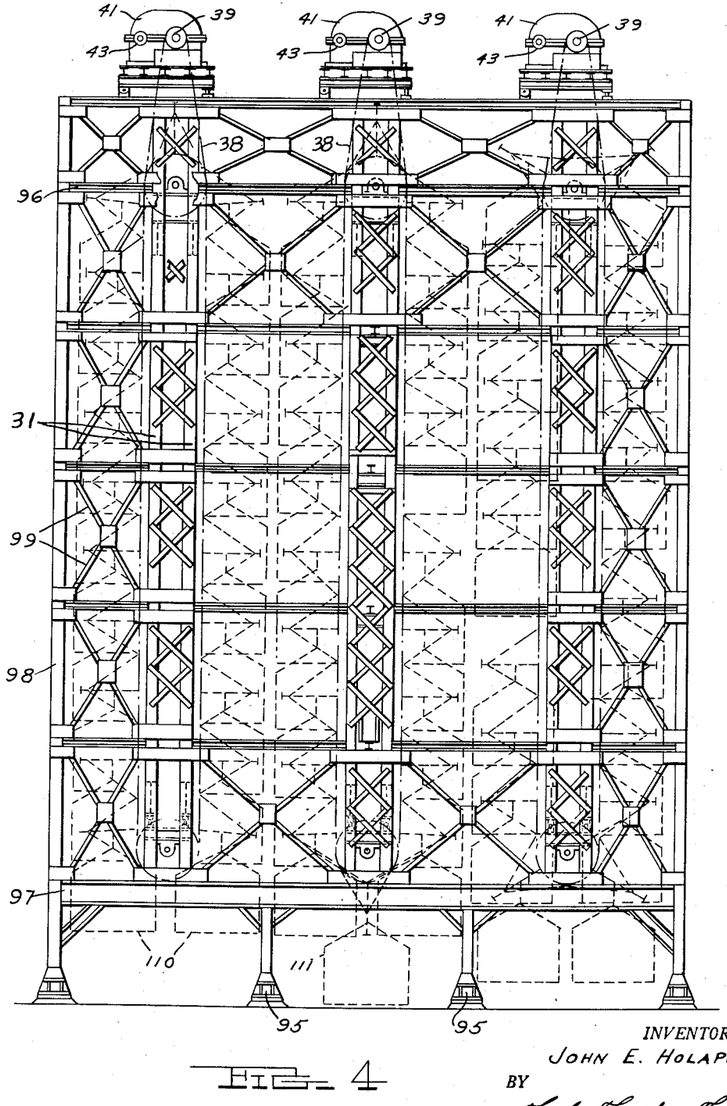
Fig. 4 is an end elevation showing a general layout structural framework for a multiple machine installation and illustrating in phantom three typical cradle positions at ground level, the left-hand machine being in a storage position with an open space at the bottom for driving clearance, the central machine having a cradle in loading position, and the right-hand machine showing normal adjacent cradles in the absence of an open space.
Figure 5:
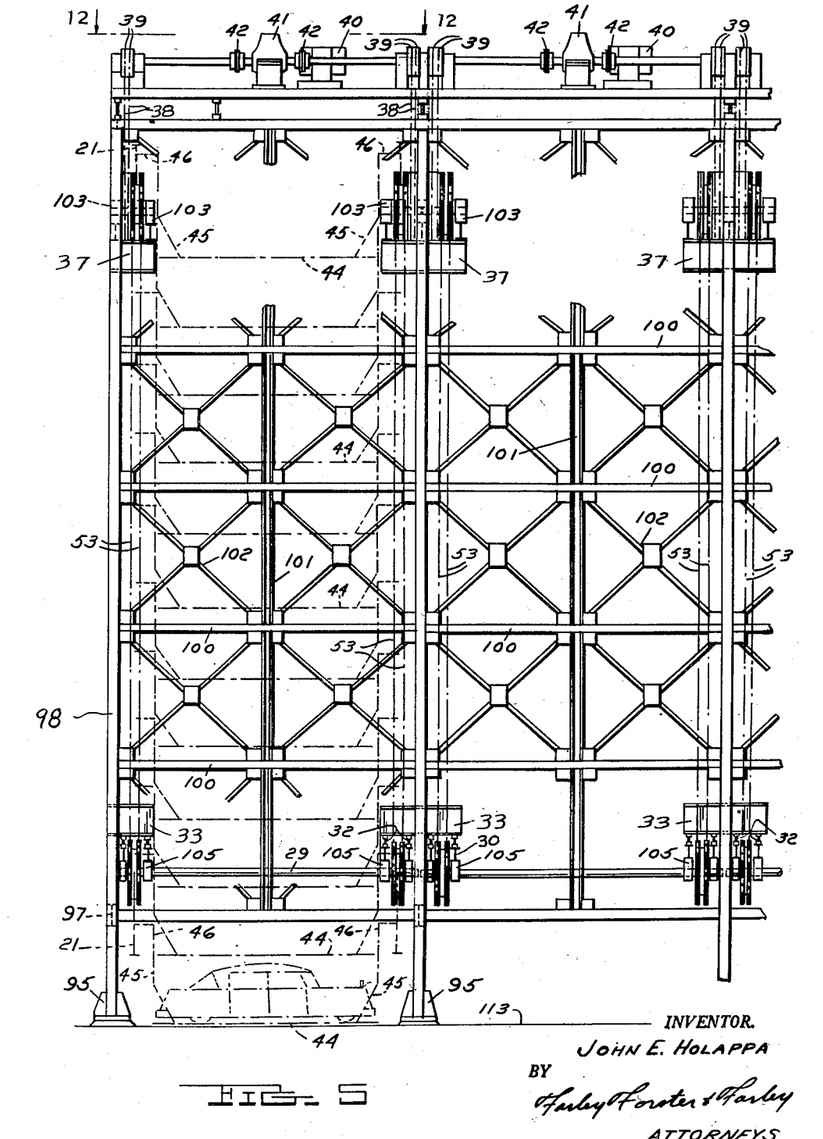
Fig. 5 is an end elevation similar to Fig. 4 showing the general structural framework for a multiple machine installation.
Figure 6:
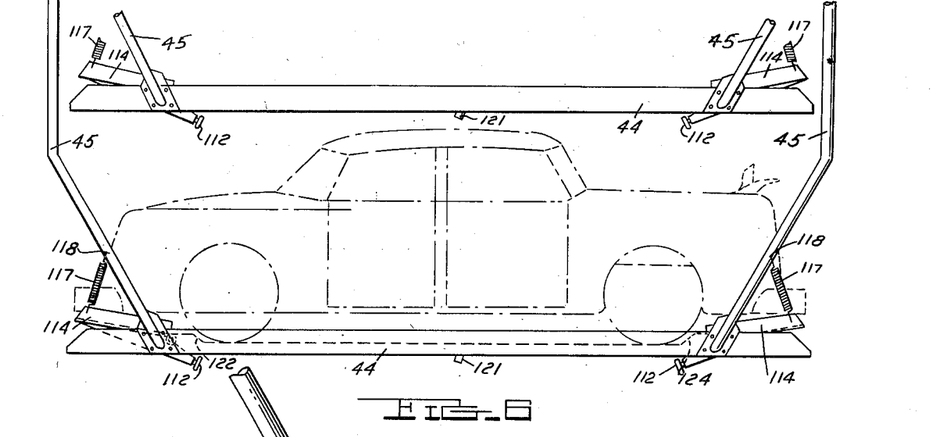
Fig. 6 is a fragmentary side elevation showing adjacent cradle platforms in their normal vertical or storage relationship.

As shown in Fig. 4, when an open space in the conveyor is brought to its lowermost position the adjacent cradles 110 on either side thereof are above car level to provide driving clearance under either side of the conveyor. When an open cradle is brought to floor level as shown at 111 in Fig. 4, rollers 112 (see Fig. 7) engage the floor surface 113 causing ramp sections 114 pivotally connected to either end of the bottom cradle platform 115 at 116 to lower to floor level against the force of ramp lifting springs 117 anchored to the cradle at 118 as shown in Fig. 6. At the same time when the cradle platform is at floor level a valve 119 is opened by engagement of a contact member 121 with the floor surface thereby draining any melted snow or other accumulated liquid.

Figure 7:
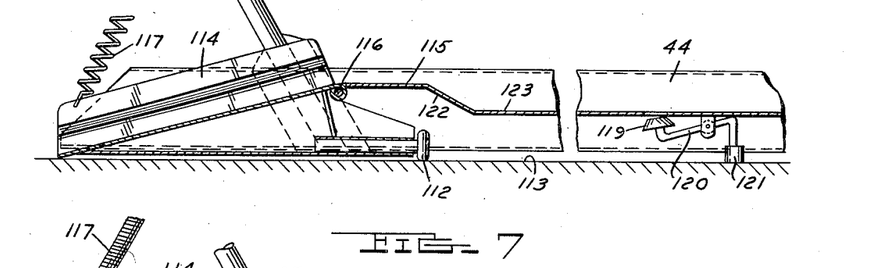
Fig. 7 is an enlarged fragmentary sectional side elevation of one end of a cradle platform shown at ground level with an end ramp actuated to a loading position and a discharge valve actuated to open position by floor contact.
Figure 8:
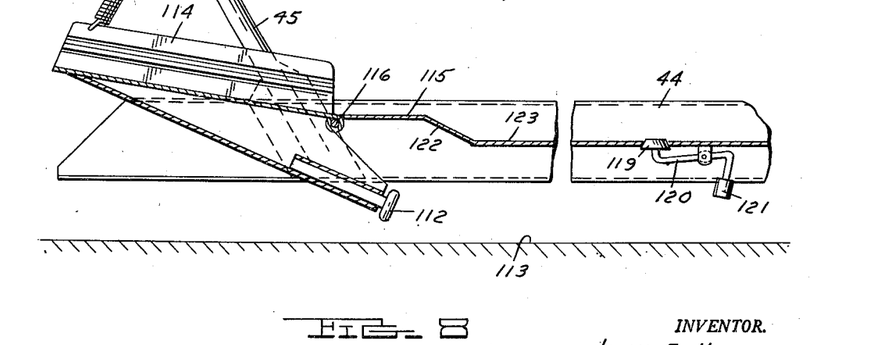
Fig. 8 is a view similar to Fig. 7 showing the end ramp elevated to its normal position and the valve to its closed fluid retaining position.

When a car has been driven up the ramp and onto the platform its rear wheel will be located forward of an inclined section 122 leading to the main lowermost supporting surface 123 of the cradle platform which inclined section 122 together with a similar inclined section 124 at the front end of the platform will serve to retain the car against longitudinal movement so that hand brake or gear lock need not be relied upon. When the driver has left the car and the conveyor is actuated to move the cradle toward a storage position, the ramp 114 at either end of the cradle platform is raised by spring 117 to an elevated position and the valve 119 is restored by the weighted contact member 121 to a closed position whereupon any melted snow or water dropping from the car onto the cradle platform will flow to the central lower floor portion 123 where it will remain accumulated until the car is delivered at the end of the storage period, thereby protecting all cars below during storage.

When a loaded cradle is moved to the storage position, an open space may be restored to the bottom of the machine or another open cradle may be moved to receiving position depending on particular requirements and the condition of the garage as a whole. Thus, in meeting early morning parking requirements an entire bank of machines at one end of the garage may be conditioned with open cradles in receiving position in order to facilitate rapid loading and each cradle when loaded may be moved only a single space in order to bring the next unloaded cradle into receiving position. When a single machine or bank of machines has been fully loaded the open space may then be brought into registration at the bottom of the machine and longitudinally adjacent machines may be progressively conditioned for immediate loading.

On the other hand, when early morning rapid parking requirements are passed and cars are moving both in and out of the garage at more gradual rates, only one or two or an occasional machine may be conditioned for receiving while a majority of the floor space may be left open to facilitate driving out from any delivery position of any machine, while in the late afternoon it may be desirable to maintain all machines in open position except when delivery is required. Depending on particular exit provisions it may be possible to deliver simultaneously from an entire bank of laterally spaced machines each machine being restored to an open position after the delivered car has been driven off. In like manner, simultaneous delivery may be effected from alternate longitudinally spaced machines, one open machine ahead of a delivered car being sufficient to negotiate a turn out of a given longitudinal line of machines.

While the specific electrical control system which may be employed in a given garage installation does not form a part of this invention and is omitted from the disclosure, it is contemplated that reversible motors should be employed and that delivery of a given car from a given storage position should be accomplished by the shortest route.

In a typical twenty-car machine (ten-car height) employing 6-foot 6-inch vertical spacing, a maximum travel of 72 feet will be involved in delivering a car from the top of the machine to floor level.

Assuming a conveyor speed of 72 feet per minute and a maximum car weight of 4300 pounds, a maximum load condition would occur if the conveyor were loaded with ten cars on one side only which would require, apart from friction losses, approximately 94 horsepower. Since a maximum ten-car load condition will never prevail throughout an entire delivery period it may be conservatively assumed that a 100 horsepower motor would be adequate to maintain a maximum delivery time of less than one minute and an average delivery time of less than one-half minute while the time required to load adjacent cradles, as in early morning parking operations, would be only a small fraction of a minute.

Thus, it will be seen that the machine lends itself to highly practicable power requirements as well as loading and delivery rates with a maximum of flexibility to meet various peak requirements of loading and/or delivery as well as maximum flexibility from the standpoint of providing any number of multiple machine installations to fully utilize available ground areas with a total car capacity exceeding that of conventional garage systems.

While a particular preferred embodiment has been disclosed in detail together with several alternate cradle suspension linkage systems capable of maintaining substantially minimum vertical spacing while providing gradual acceleration of cradles negotiating sprocket turns and required clearance throughout such turns, it will be understood that numerous modifications in detailed construction may be resorted to without departing from the scope of my invention as defined in the following claims.

I claim:

1. An automobile parking machine comprising structural framework extending to multiple automobile height, opposed, endless, vertical chain conveyors each passing over axially spaced upper and lower sprockets, said sprockets being rotatably supported by said framework, a plurality of individual automobile cradles pivotally suspended between said conveyors, cradle suspension linkage connecting said cradles to said conveyors at points providing substantially minimum clearance spacing between adjacent loaded cradles in vertical travel, said linkage comprising cradle suspension arms pivotally connected to and extending outwardly from said chain conveyors, each arm having a cradle suspension point substantially spaced from the respective ends thereof and outside of the path of travel of said conveyor chain, a pair of supporting arms for each outwardly extending cradle suspension arm, said supporting arms being pivotally connected to said chain conveyor at points oppositely spaced from the chain connection of said outwardly extending arm, the outer ends of said supporting arms being pivotally connected to each other and slidably connected to said outwardly extending arm outside of its cradle suspension point.

2. In an automobile parking machine of the type wherein structural framework extends to multiple automobile height and supports opposed, endless, vertical conveyors changing directions at top and bottom and having a plurality of individual automobile cradles pivotally suspended therebetween, opposed, endless, conveyor chains passing over upper and lower sprockets, cradle suspension arms pivotally connected to said chains, each of said arms extending outwardly to one pivotal suspension point of a cradle, adjacent arms being spaced a distance providing substantially minimum clearance between adjacent loaded cradles in vertical travel, a pair of supporting arms for each suspension arm, said supporting arms having pivotal chain connections at points oppositely spaced from the chain connection of said suspension arm, the outer ends of said supporting arms being pivotally connected to each other and slidably connected to said suspension arm.

3. Automobile parking machine conveyor means as set forth in claim 2 wherein said supporting arms extend to a common pivotal connection substantially outside of the associated cradle suspension point in normal vertical travel and move to a point outside of but more closely adjacent said cradle suspension point in negotiating a turn.

4. Automobile parking machine conveyor means as set forth in claim 2 wherein said supporting arms extend to a common pivotal connection inside and closely adjacent said associated cradle suspension point in normal vertical travel and move to a relatively more inward position in negotiating a turn.

5. Automobile parking machine conveyor means as set forth in claim 2 wherein the linear spacing of each pair of supporting arm chain connecting points is in the order of one half of the sprocket circumference.

6. Automobile parking machine conveyor means as set forth in claim 2 wherein adjacent pairs of supporting arms have common chain connecting points.

7. Automobile parking machine conveyor means as set forth in claim 2 wherein adjacent pairs of supporting arms have common chain connecting points and the linear spacing of said common connecting points is in the order of one half of the sprocket circumference.

References Cited in the file of this patent

UNITED STATES PATENTS

| | | |
|---|---|---|
| 844,806 | Jones | Feb. 19, 1907 |
| 1,287,984 | Haschek et al. | Dec. 17, 1918 |
| 1,859,874 | James | May 24, 1932 |
| 1,872,594 | James | Aug. 16, 1932 |
| 2,069,886 | Joslin | Feb. 9, 1937 |
| 2,078,770 | Morton | Apr. 27, 1937 |
| 2,089,047 | Zrna | Aug. 3, 1937 |
| 2,242,891 | Light | May 20, 1941 |
| 2,315,790 | Hallwood | Apr. 6, 1943 |
| 2,619,239 | Hild et al. | Nov. 25, 1952 |